(12) United States Patent
Nanni et al.

(10) Patent No.: US 6,805,177 B2
(45) Date of Patent: Oct. 19, 2004

(54) HIGH PERFORMANCE TIRE WITH TREAD BAND HAVING AN ANISOTROPIC UNDERLAYER STABLE WITH TEMPERATURE VARIATION

(75) Inventors: Marco Nahmias Nanni, Milan (IT); Antonio Serra, Genoa (IT); Antonio Brunacci, Luxembourg (LU)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/038,622

(22) Filed: Jan. 8, 2002

(65) Prior Publication Data

US 2002/0148545 A1 Oct. 17, 2002

Related U.S. Application Data

(63) Continuation of application No. PCT/EP00/06357, filed on Jul. 4, 2000.
(60) Provisional application No. 60/145,976, filed on Jul. 29, 1999.

(30) Foreign Application Priority Data

Jul. 9, 1999 (EP) .............................................. 99202260

(51) Int. Cl.$^7$ ............................ B60C 11/00; B60C 1/00; B29D 30/52
(52) U.S. Cl. ............................... 152/209.4; 152/209.5; 152/458; 152/532; 156/123; 156/128.1
(58) Field of Search ........................... 152/209.4, 209.5, 152/532, 458; 156/123, 128.1

(56) References Cited

U.S. PATENT DOCUMENTS

| | | |
|---|---|---|
| 3,759,306 A | 9/1973 | Greiner et al. |
| 3,772,130 A | 11/1973 | Marzocchi |
| 3,916,968 A | 11/1975 | Masson |
| 4,546,143 A | 10/1985 | Weil et al. |
| 4,871,004 A | 10/1989 | Brown et al. |
| 5,226,987 A | 7/1993 | Matsumoto et al. |
| 5,513,683 A | 5/1996 | Causa et al. |
| 5,576,104 A | 11/1996 | Causa et al. |
| 2002/0017347 A1 | 2/2002 | Nanni et al. |

FOREIGN PATENT DOCUMENTS

| | | |
|---|---|---|
| CA | 1 228 282 | 10/1987 |
| EP | 0 098 353 A2 | 1/1984 |
| EP | 0 370 664 A2 | 5/1990 |
| EP | 0 592 218 A1 | 4/1994 |
| EP | 0604108 | 6/1994 |

(List continued on next page.)

OTHER PUBLICATIONS

H. Takashi, "High Speed Large Pneumatic Tire With High Durability", Patent Abstracts of Japan, of JP 55–152612 A, Nov. 28, 1980.

(List continued on next page.)

*Primary Examiner*—Adrienne C. Johnstone
(74) *Attorney, Agent, or Firm*—Finnegan, Henderson, Farabow, Garrett, & Dunner, L.L.P.

(57) ABSTRACT

A high performance tire includes a carcass provided with at least one carcass ply, a belt including two or more layers of reinforcing cords parallel to each other in a layer and crossed with respect to those of an adjacent layer, applied circumferentially on the carcass, a radially-external layer of circumferentially-oriented reinforcing cords applied on the belt, and a tread band comprising an underlayer and an external layer. The underlayer may have a hardness which is substantially constant over a temperature range between 23° C. and 100° C. The underlayer may also have an elastic modulus which is substantially constant over a temperature range between 70° C. and 100° C. Additionally, the underlayer may be made from an elastomer compound comprising reinforcing fibers and hardening resins. Further, the underlayer may have a hardness and an elastic modulus which remain substantially constant between 70° C. and 100° C. A method for making the tire is also disclosed.

25 Claims, 2 Drawing Sheets

FOREIGN PATENT DOCUMENTS

| | | |
|---|---|---|
| EP | 0652116 | 5/1995 |
| EP | 0 691 218 A2 | 1/1996 |
| EP | 0 698 510 A2 | 2/1996 |
| EP | 0 904 958 A2 | 3/1999 |
| EP | 0 978 533 A1 | 2/2000 |
| FR | 2215331 | 8/1974 |
| JP | 63-263104 | 10/1988 |
| JP | 06-191208 | 12/1994 |
| WO | WO 00/24596 | 5/2000 |

OTHER PUBLICATIONS

Patent Abstracts of Japan, JP 61–119,407, Pneumatic Tire, Masaki Ogawa, Jun. 6, 1986.

Patent Abstracts of Japan, JP 04–274,903, Pneumatic Tire Michihiro Tamaoki, Sep. 30, 1992.

Derwent Abstract, JP 63–263,104, Cutting–Resistant Radial Tyre for Large Vehicles, Yokohama Rubber KK.

Abstract, JP 06–191,208, Pneumatic Radial Tire, Hiroyuki Teratani.

HIGH PERFORMANCE TIRE WITH TREAD BAND HAVING AN ANISOTROPIC UNDERLAYER STABLE WITH TEMPERATURE VARIATION

This application is a continuation of International Application No. PCT/EP00/06357, filed Jul. 4, 2000, in the European Patent Office, the contents of which are relied upon and incorporated herein by reference; additionally, Applicants claim the benefit under 35 U.S.C. §119(e) based on prior-filed, copending provisional application No. 60/145,976, filed Jul. 29, 1999, in the U.S. Patent and Trademark Office.

The present invention relates to high performance tyres such as, for example, tyres designed for high-powered cars or, more generally, tyres intended for applications involving high operating speeds.

DESCRIPTION OF THE RELATED ART

These tyres, which are commonly referred to as "HP" and "UHP" (High Performance and Ultra High Performance) tyres, are in particular those belonging to the Classes "V" and "Z" that respectively provide for maximum speeds over 210 Km/h and 240 Km/h, for which the operating performance is undoubtedly one of the most important features.

This performance depends both on the friction coefficient (or grip) and on the response to lateral stresses of the tyre during rolling on the road surface.

Usually the friction coefficient depends on the properties of the compound used for the tread, while the response to lateral stresses and to centrifugal forces depends on the tyre structure; for these reasons there exist structures designed to compensate for the force systems to which HP and UHP tyres are subject.

One of these structures envisages the presence of a so-called "0°" layer, namely a layer of rubber reinforced by a cord which is usually heat-shrinkable, for example made of nylon, wound spirally in the circumferential direction around the tyre belt.

The winding angle of the cord with respect to a median (or equatorial) plane of the tyre is fairly small and it is for this reason that the layer in which it is located, is referred to as a "0°" layer; the tread band is then mounted on top of this layer.

From Canadian patent CA 1228282 in the name of Bridgestone and European patent EP 592218 in the name of Sumitomo it is also known to form the tread band with what is commonly known as "cap and base" structure, namely consisting of two layers circumferentially arranged one upon the other wherein the radially innermost layer forms the "base" or underlayer, while the other outermost forms the "cap" and is the layer which is intended to roll on the road.

In particular, the first of these documents suggests to combine an underlayer with an external cap having a high grip and a predefined ratio between its modulus of elasticity and that of the underlayer, in order to improve the steering performance of the tyre at high speeds.

European patent EP 592218 teaches, on the other hand, to add reinforcing fibres to the compound of the underlayer and orienting them in a particular manner so as to obtain an anisotropic behaviour thereof with a different modulus of elasticity, respectively, in a circumferential and a transverse direction with respect to the tyre.

In this way it is possible to obtain a tyre with excellent stability during bends, a high level of comfort during travel as well as a low rolling resistance.

Finally, from European Patent Application EP 691218 published in 1996 it is known to manufacture tyres with properties which are substantially equivalent to those of tyres with a reinforcing layer consisting of nylon cords arranged at 0°, by providing, in place of the latter, a tread underlayer reinforced by fibres of a particular size and strength.

These fibres consist of materials such as polyamides (in particular aromatic polyamides shortly referred to as "aramides"), polyesters or polyolefins, which are already known in the art for their use in the manufacture of tyres.

For example, with regard to aramide fibres, a detailed description of their use in the tyre sector is given in the American patent U.S. Pat. No. 4,871,004, which is hereby incorporated by reference.

One of the reasons justifying the use of the abovementioned fibres lies in the fact that they generally allow to achieve a good structural resistance with a reduced weight.

There are, however, certain technical aspects which must be taken into account when using the fibres in question.

Indeed, their use instead of, or in combination with, materials of the traditional type used in the manufacture of tyres, is an area which today is still not fully known: it is therefore important to be able to optimize the use of the fibres in order to obtain the required features of the tyres.

The HP and UHP tyres currently known are not fully satisfactory from the point of view of their performance at high speed and over long operating periods: the present invention proposes to solve this problem by providing a high performance tyre having structural and operating features that remain substantially unvaried during the different conditions of use.

SUMMARY OF THE INVENTION

The invention arises from the Applicant's realization that the characteristics of a high modulus and/or hardness of the compound of the underlayer, as an alternative to or in combination with each other, must also be guaranteed at the high speeds referred to above and in particular must not deteriorate with an increase in the temperature due to prolonged use at high speed, and that this object may be attained using the abovementioned fibres.

In particular the Applicant has discovered that the problem may be solved using a tyre wherein on the reinforcing layer with cord at 0°, there is applied a tread band with a "cap and base" structure whose underlayer has hardness and/or elasticity values which are substantially stable between 23° C. and 100° C.

Owing to these features, in fact, the tyre ensures a uniform performance also at the high operating speeds which may cause a substantial increase in the temperature of the tread.

In accordance with one of its more specific aspects, the invention relates to a tyre wherein the hardness of the tread underlayer between 23° C. e 100° C. does not vary by more than five units on the IRHD (International Rubber Hardness Degrees) scale; preferably this variation must not exceed three units and, even better, one IRHD unit.

According to another more specific aspect of the invention, the tyre tread band has an underlayer with a dynamic modulus (E') which between 70° C. and 100° C. does not vary by more than 10% and, preferably, varies by less than 5%.

In accordance with a preferred embodiment of the invention, the tread underlayer also has high ratios (greater than 4) between the rigidity in the direction of travel (i.e. in the circumferential direction) and in the direction perpendicular to it; this means that it has an anisotropic behaviour.

The properties of the tread underlayer indicated above may be obtained using a compound reinforced with a quantity of fibres preferably ranging between 3 and 10 phr (parts per hundred of rubber), and even more preferably between 6 and 9 phr, in combination with hardening resins; the latter are preferably based on resorcinol and methylene donors.

These resins may be either in the form of two components or in the precondensed form, while preferred methylene donors include hexamethoxymethyhuelamine (HMMM) or hexamethylenetetraxnine (HMT); the Applicant has found, however, that other methylene donors and other types of hardening resins may be used.

BREIF DESCRIPTION OF THE DRAWINGS

These and further features of the invention will emerge more clearly from the detailed description of a preferred but not exclusive embodiment thereof, which is provided below with reference to the accompanying drawings, wherein.

DETAILED DESCRIPTION OF THE EXEMPLARY EMBODIMENTS

Figure 1:
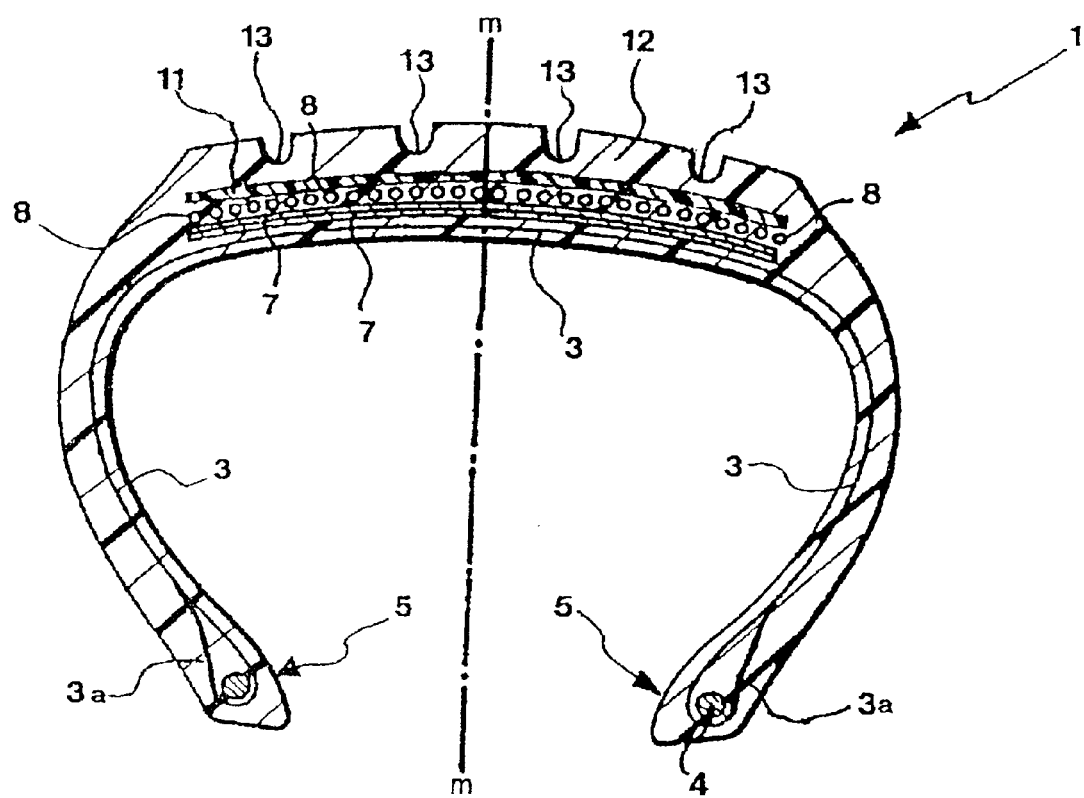
FIG. 1 shows a cross-sectional view of a tyre according to the invention.

In the drawings, reference 1 indicates a tyre according to the invention.

This tyre comprises a carcass provided with at least one ply 3, the ends 3a thereof are associated with respective cores 4 (commonly known as bead wires), each of which is incorporated in a bead 5 defined along the inner circumferential edge of the tyre; the core or bead wire 4 of the beads may be constructed in any manner known in the art, for example using metal wires or cords.

The beads 5 are intended to rest against the edge of the rim, not shown in the drawings, on which the tyre 1 is mounted.

Around the carcass there are circumferentially applied one or more belt layers 7, made conventionally with a meshwork of metal strands or cords embedded in a rubber sheet, and arranged parallel to each other in a layer and crossed with respect to those of the adjacent layer.

Above the belt 7 there is the 0° layer in which a cord 8, for example made of nylon, is spirally wound coaxially with the tyre; the winding angle of the cord 8 is, as usual, small with respect to a median plane m-m of the tyre and said cord is also incorporated in a rubber layer, as is commonly performed in the art (using so-called "strips" or other solutions).

The tyre 1 also has a tread band 10 which is peripherally mounted around the 0° layer; more specifically, this tread band is of the "cap and base" type formed by an underlayer 11 and an external layer 12 on which a tread pattern, comprising recesses and grooves 13 that define a plurality of seams and blocks, is formed in a conventional manner.

As can be seen in the Figures, the underlayer 11 of the tread 10 in this case has a uniform thickness; preferably this thickness is greater than 1 mm and, even more preferably, is between 1.5 and 2 mm.

Figure 2:
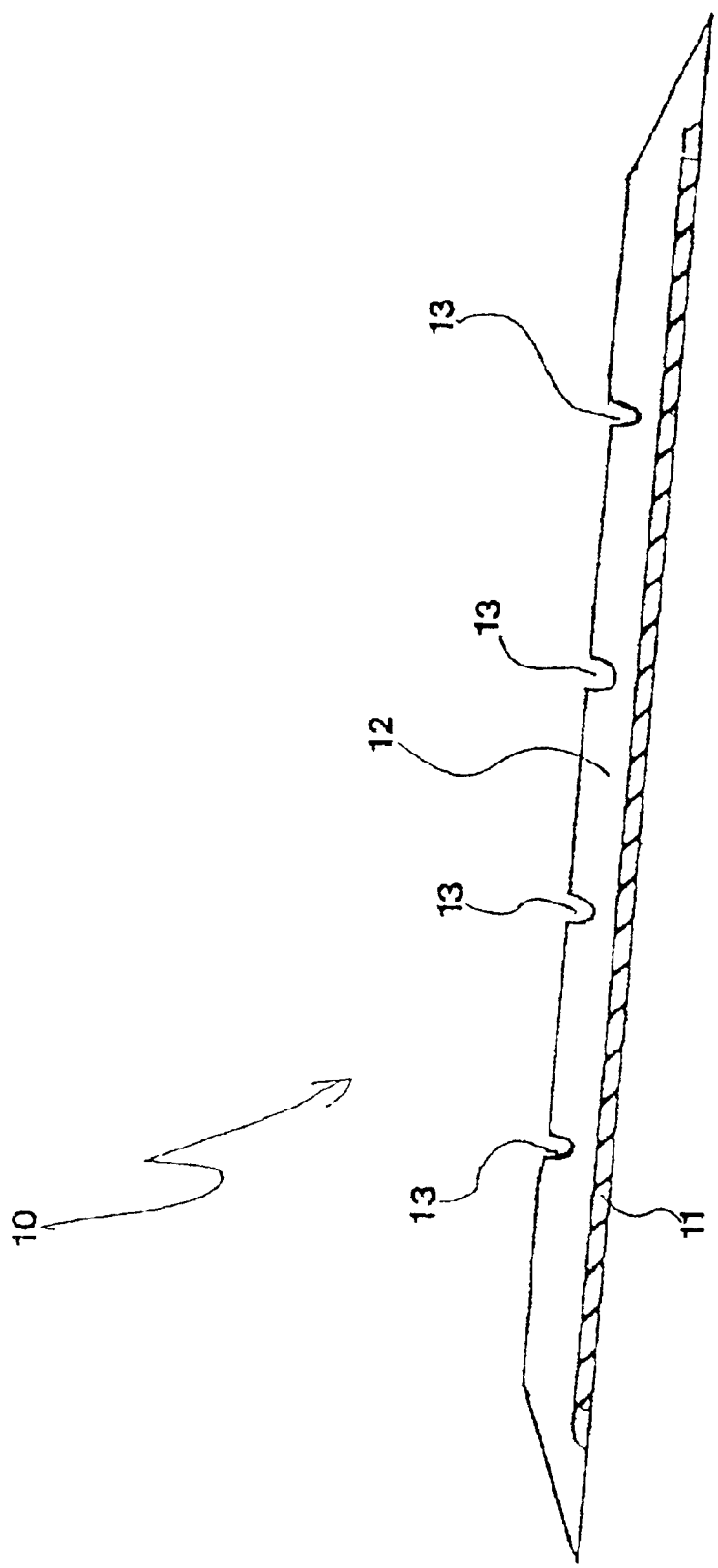
FIG. 2 shows in detail a cross-sectional view of the tread of the tyre of the preceding figure.

It must be pointed out, however, that the thickness of the underlayer 11 may in any case not be uniform but, for example, greater in the vicinity of its outer edges (with reference to the cross-sections shown in FIGS. 1 and 2) and/or in the central zone.

The external layer 12 of the tread band must have a thickness at least equal to, and preferably greater than, that of the grooves 13 (usually 7–8 mm in car tyres), so as not to allow the underlayer to come into contact with the road when the external layer is worn.

The compound from which the underlayer 11 is formed, preferably based on natural rubber, is preferably reinforced with aramide fibres, in this case made from Kevlar® produced by the company Du Pont de Nemour, in the present example these fibres have a configuration with a main trunk having a diameter D equal to about 10 $\mu$m and a length L of about 200 $\mu$m, from which small branches or fibrils extend.

In this way the fibres have an aspect ratio L/D of the order of 20 units.

In particular, a material has been used in which the abovementioned fibres (commonly known as "Kevlar® pulp") are dispersed in a natural rubber, thereby giving rise to a "masterbatch" distributed by the company Du Pont under the tradename Kevlartex®, having a composition of 23% Kevlar® and 77% natural rubber.

The use of the masterbatch instead of the fibres alone is to be preferred, because it allows to mix and apportion them more effectively with the elastomer compound which is used to produce the underlayer 11.

The composition of the compound of the underlayer is shown in detail in Table 1, where for the various elements the common tradename and a brief chemical definition are indicated.

Thus, for example the abbreviation E-SBR followed by a number is conventionally used to indicate a type of synthetic emulsion-polymerized rubber ("Styrene Butadiene Rubber"), in accordance with conventional international standards (normally ASTM or ISO), or the abbreviation consisting of the letter N followed by a number indicates the type of carbon black in the ASTM nomenclature.

The numerical values shown in Table 1 refer to the percentages with respect to the rubber (phr) and the overall compound; in the case in question it just has to be mentioned that the compound used contains 39 phr of Kevlartex® and therefore, in view of the composition of this masterbatch, it means that basically the 39 phr present are divided up into 30 phr of natural rubber (NR) and 9 phr of aramide fibres.

TABLE 1

| COMPOSITION OF THE UNDERLAYER COMPOUND | | | |
|---|---|---|---|
| Ingredient | Description | phr | % |
| NR | Natural rubber | 30.0 | 14.45 |
| E-SBR 1712 | 23% bond styrene, oil extended | 55.0 | 26.49 |
| Carbon black | Series N300 | 60.0 | 28.90 |
| Zinc oxide | ZnO | 8.00 | 3.85 |
| Crystex ® OT 33 | 67% insoluble sulphur (oiled) | 5.25 | 2.53 |
| Cyrez ® 963 (hardening resin) | Hexamethoxymethylene-melamine (HMMM) 65% a silica supported | 5.00 | 2.41 |
| Rhenogran Resorcinol ® 80 (hardening resin) | 80% polymer supported | 1.88 | 0.91 |
| DCBS (accelerants) | N,N'-dicyclobenzo-thiazole-sulphamide | 1.50 | 0.72 |

TABLE 1-continued

COMPOSITION OF THE UNDERLAYER COMPOUND

| Ingredient | Description | phr | % |
|---|---|---|---|
| 6 PPD (anti-oxidant) | Para-phenylenediamine | 2.00 | 0.96 |
| Kevlartex ® | 23% Kevlar ®, 77% NR | 39.0 | 18.78 |
| TOTAL | | 207.63 | 100 |

It is specified here that Crystex ® OT 33 is distributed by the company FLEXIS, Cyrez ® 963 by the company CYTEC and Rhenogran Resorcinol ® 80 by RHEINCHEMIE.

As can be seen from the table, in this example of the invention hardening resins based on resorcinol and methylene donors (in particular HMMM) in the form of two components have been used.

The preferred methylene donors include, in addition to HMMM, hexamethylenetetramine (HMT); other donors, however, could also be used and the hardening resins may also be in the precondensed form.

As an alternative to the resins mentioned above, other hardening resins may be used, such as, for example, those based on epoxides-polyols, epoxides-diamines, epoxides-dicarboxylic acids or resins obtained by reacting alcohol with a diacid (alkyd resins).

These resins may be used either in precondensed form and in the form of two components.

From a general point of view it can be stated that the quantity of hardening resins utilized in the compound of the underlayer, may be optimized depending on the mechanical properties (modulus, hardness, etc.) which are to be obtained.

Consequently, in the present invention, if resins based on resorcinol and methyelene donors are used, it is preferable to use a quantity of precondensed resin greater than 0.5 phr. In the case of two-component systems, however, it is preferable to have a quantity of resorcinol greater than 0.5 phr and a quantity of methylene donor (type HMMM) which is in a ratio of between 0.5 and 3 therewith.

The underlayer 11 obtained with the compound according to the invention may be coextruded together with the external layer 12, or may be formed separately and assembled together with the latter subsequently; coextrusion is, however, preferable for obtaining underlayers of limited thickness and if necessary for shaping their profile.

The compound of the above tables was subjected to a series of mechanical tests for determining the values of some of its properties, including the hardness and the elasticity; the results of these test are shown in the following Table 2.

With regard to the hardness, tests were carried out in accordance with the standard ASTM 1415 and with regard to the elasticity, the experiments consisted in measuring the dynamic modulus E' on cylindrical test-pieces with a diameter of 12 mm and height of 25 mm.

In particular, these test-pieces were formed by rolling up strips slightly wider than 25 mm (i.e. the height of the test pieces themselves), which were obtained by calendering a 1 mm thick strip cut in the direction of orientation of the fibres inside it; following rolling-up of the strips, the fibres are then arranged in the circumferential direction with respect to the cylinder which forms the test piece.

It is reminded here that the operations of calendering and extrusion of the compound produce the effect of orienting the fibres incorporated in the compound, along the respective directions with which they occur.

The test pieces were then vulcanized for a duration of 30 minutes at 151° C. and subjected to dynamic tests performed with a (sinusoidal) frequency of 100 Hz, applying an initial pre-strain of 10% and a true dynamic strain equal to 0.033; this latter variable represents the deformation in relation to the length of the pre-deformed test piece.

Further variables taken into consideration during the tests, the results thereof are shown in Table 2, include the load at 10% of elongation strain in the calendering direction (M1) and in the direction transverse thereto (M2).

Such load values were obtained in accordance with the standard ASTM 412, by subjecting to traction traditional test pieces of the Dunbbell type; they provide an evaluation of the strenght of the underlayer in mutually perpendicular directions. The ratio M1/M2 shown in the table constitutes an index of the anisotropy of the underlayer due to the presence of the oriented fibres.

Finally, in order to appreciate more fully the features of this example of the invention, Table 2 also shows the results of comparative experiments carried out on samples of compounds corresponding to the already mentioned European patent EP 592218 (Sumitomo Rubber Industries) and patent CA 1228282 (Bridgestone), respectively.

TABLE 2

| TESTS | Invention | Example 2 | Example 3 |
|---|---|---|---|
| IRHD at 23° C. | 90 | 89 | 77.5 |
| IRHD at 100° C. | 89 | 83 | 67.4 |
| Load M1 at 10% elongation in the calendering direct-ion (MPa) | 11.77 | 11.62 | 2.5 |
| Load M2 at 10% elongation in the direction transverse to that of calendering (MPa) | 1.23 | 1.5 | 2.05 |
| M1/M2 | 9.6 | 7.75 | 1.22 |
| E' 23° C. (MPa) | 36.71 | 34.91 | 11.42 |
| E' 70° C. (MPa) | 33.18 | 20.32 | 7.16 |
| E' 100° C. (MPa) | 33.15 | 16.67 | 5.7 |

From Table 2 it can be appreciated how the compound according to the invention is much more stable with respect to the temperature (thermostable), than those of Examples 2 and 3.

In particular the hardness is very stable between 23° C. and 100° C. (ranging, from 90 IRHD to 89 IRHD within the limits of the measuring range); more generally, the hardness variation must in any case not be greater than 5 IRHD in the abovementioned temperature range.

In accordance with the invention the hardness of the underlayer, in terms of absolute value, is preferably greater than that of the external layer of the tread band; more specifically, this hardness must be preferably greater than 80 IRHD at 100° C. and, even more preferably, greater than 85 IRHD at 100° C.

Likewise the hardness, also the elastic modulus E' in the case of the invention is not subject to major variations between 70° C. and 100° C., whereas the same cannot be said for the compounds of Examples 2 and 3.

Preferably the variation of the elastic modulus E' is not greater than 10% and, even more preferably 5%, in the abovementioned temperature range.

In accordance with the invention, the absolute value of the elastic modulus E' of the underlayer is preferably greater than that of external layer of the tread band: more specifically, this modulus must be preferably greater than 15 MPa at 100° C. and, even more preferably, greater than 20 MPa at this temperature.

The Applicant has realized that, with the values for hardness and/or elastic modulus E' mentioned above, a substantial qualitative increase in all the known tyres is obtained, independently of the characteristics of the external layer of the tread band.

Finally, from Table 2 it may be noted how the ratio M1/M2 for the example of the invention is greater than 9; more generally, this ratio must be greater than 3.

For the sake of greater completeness of the description, there are now reported the compositions of the underlayer compounds relating to Examples 2 and 3, obtained on the basis of the descriptions of the patents mentioned above.

TABLE 3

| Ingredient | EXAMPLE 2 (phr) | EXAMPLE 3 (phr) |
| --- | --- | --- |
| NR | 26 | |
| E-SBR 1712 | | 137.5 |
| SBR 1500 | 20 | |
| Carbon black (N324) | 40 | |
| Carbon black (N326) | | 90 |
| Zinc oxide | 3 | 3 |
| Sulphur | 1.75 | 1 |
| Accelerants | 1 | 1.8 |
| Anti-oxidants | 2 | 2 |
| Kevlartex ® | 74 | |

From the point of view of performance, the tyres manufactured in accordance with the invention have achieved surprisingly superior results compared to other tyres of the HP and UHP type; these results are summarised in the following Table 4 showing ratings on a scale of values ranging from −2 a +2, in respect of particular behavioural parameters of the tyres.

These parameters relate to the behaviour during bends (oversteering and understeering), grip, lateral stability, response to lane changing and performance constancy; this latter index refers to the ability of the tyre to keep unchanged the level of performance at high speeds and consequently with an increase in temperature.

The tests were carried out using tyres of size 255/40 R 17, mounted on the rear axle of a Porsche Carrera 996.

TABLE 4

| | INVENTION | EXAMPLE 3 |
| --- | --- | --- |
| Steering | 2 | 1.2 |
| Grip | 2 | 2 |
| Lateral stability | 2 | 1.5 |
| Lane changing | 2 | 1 |
| Performance constancy | 2 | 1.3 |

As can be seen, Table 4 confirms what was stated above regarding the results achieved by the invention; the tyre, indeed, achieves excellent results for all the parameters considered, obtaining the maximum rating in all the categories and being remarkably superior to the tyre of Example 3, with the sole exception of the grip.

Indeed, it must be emphasized that such an exception further confirms the results obtained.

In fact, as is known, the grip of a tyre depends in particular on the compound of the "cap" of the tread and not on that of the underlayer; in this case, since the same compound has been used for the external layer of the tyre according to the invention and that of the tyre according to Example 3, the data relating to the grip is itself consistent with that which could be expected.

This confirms therefore how the better performance achieved by the tyres according to the invention for the other parameters considered, are to be attributed to the underlayer 11 and to the compound from which it is made.

Finally it is important to point out also another advantageous aspect which distinguishes the compound from which the underlayer according to the invention is made: its good processability.

During experiments it was found that an excessive quantity of fibres with respect to the rubber of the compound (i.e. exceeding the ranges suggested by the invention), may negatively influence the proccessability of the said compound and cause problems for the subsequent production of the tread with the underlayer.

The quantities of reinforcing fibres used for the invention have, on the other hand, managed to eliminate these negative consequences, thereby making the invention very advantageous from the point of view of industrial production.

Obviously variations of the invention may be envisaged with respect to the preferred and non-exclusive embodiment thereof which was described above.

At first it must be pointed out that the reinforcing fibres used may be different from the Kevlar® mentioned above; other aramide fibres may indeed be used, such as for example those known with the name Twaron® and distributed by the company Akzo Nobel; also in general the Applicant has found that it is possible to use fibres based on other polyamides or on polyesters, polyolefins, polyvinyl alcohol, nylon, glass, carbon or the like.

As regards the structure of the tyre, the usual thin joining sheet may be inserted between the 0° reinforcing layer and the tread underlayer, as already occurs in the known art.

These changes, together with others, fall however within the scope of the claims which follow.

What is claimed:

1. A high performance tyre, comprising:
    a carcass provided with at least one carcass ply;
    a belt comprising two or more layers of reinforcing cords parallel to each other in a layer and crossed with respect to those of an adjacent layer, applied circumferentially on the carcass;
    a radially-external layer of circumferentially-oriented reinforcing cords applied on the belt; and
    a tread band comprising an underlayer and an external layer;
    wherein the underlayer is made from an elastomer compound comprising reinforcing fibers and hardening resins; and
    wherein a hardness of the underlayer does not vary by more than 5 International Rubber Hardness Degrees (IRHD) over a temperature range between 23° C. and 100° C.

2. The tyre of claim 1, wherein the hardness of the underlayer does not vary or varies by less than 5 IRHD over a temperature range between 23° C. and 100° C.

3. The tyre of claim 1, wherein the hardness of the underlayer does not vary by more than 1 IRHD over a temperature range between 23° C. and 100° C.

4. The tyre of claim 1, wherein the hardness of the underlayer is greater than 80 IRHD at 100° C.

5. The tyre of claim 1, wherein the hardness of the underlayer is greater than 85 IRHD at 100° C.

6. The tyre of claim 1, wherein the underlayer has a dynamic elastic modulus (E') that does not vary by more than 10% over a temperature range between 70° C. and 100° C.

7. The tyre of claim 6, wherein the elastic modulus of the underlayer does not vary by more than 5% over a temperature range between 70° C. and 100° C.

8. The tyre of claim 6, wherein the elastic modulus of the underlayer is greater than 15 MPa at 100° C.

9. The tyre of claim 8, wherein the elastic modulus of the underlayer is greater than 20 MPa at 100° C.

10. The tyre of claim 1, wherein the underlayer has a ratio between a 10% elongation load in a circumferential direction and a 10% elongation load in a perpendicular direction which is greater than 3:1.

11. The tyre of claim 1, wherein the hardening resins are based on components chosen from among one or more of the following groups: resorcinol-methylene donors, epoxides-dicarboxylic acids, epoxides-diamines, epoxides-polyols, and alcohol-diacids.

12. The tyre of claim 11, wherein the methylene donors are hexamethoxymethylmelamine (HMMM) or hexamethylenetetramine (HMT).

13. The tyre of claim 1, wherein the hardening resins are resins based on resorcinol and methylene donors in precondensed form in a quantity greater than 0.5 phr.

14. The tyre of claim 1, wherein the hardening resins are resins based on resorcinol and methylene donors in a form of two components, wherein a quantity of resorcinol is greater than 0.5 phr, and wherein a ratio of a quantity of methylene donors to the quantity of resorcinol is between 0.5:1 and 3:1.

15. The tyre of claim 1, wherein the reinforcing fibers are chosen from among: polyamides, polyesters, polyolefins, carbon fibers, glass fibers, and polyvinyl alcohol.

16. The tyre of claim 1, wherein the reinforcing fibers are aramid fibers.

17. The tyre of claim 16, wherein the reinforcing fibers are a quantity of aramid fibers ranging between 3 phr and 10 phr.

18. The tyre of claim 17, wherein the reinforcing fibers are a quantity of aramid fibers ranging between 6 phr and 9 phr.

19. The tyre of claim 1, wherein the underlayer has a uniform thickness greater than 1 mm.

20. The tyre of claim 9, wherein the underlayer has a uniform thickness between 1.5 mm and 2 mm.

21. The tyre of claim 1, wherein the thickness of the underlayer is variable.

22. A method for improving behaviour at high speeds of a high-performance tyre, the tyre comprising:

a carcass provided with at least one carcass ply;

a belt comprising two or more layers of reinforcing cords parallel to each other in a layer and crossed with respect to those of an adjacent layer, applied circumferentially on the carcass; and a radially-external layer of circumferentially-oriented reinforcing cords applied on the belt;

the method comprising:

mounting on a periphery of the radially-external layer a tread band comprising an underlayer and an external layer;

wherein the underlayer comprises a thermostable compound comprising reinforcing fibers and hardening resins, and wherein a hardness of the thermostable compound does not vary by more than 5 IRHD over a temperature range between 23° C. and 100° C.

23. The method of claim 22, wherein the tread band is obtained by coextruding the underlayer and the external layer.

24. The method of claim 22, wherein the underlayer is obtained by calendering.

25. The method of claim 22, wherein the thermostable compound has a dynamic elastic modulus (E') which does not vary by more than 10% over a temperature range between 70° C. and 100° C.

* * * * *

UNITED STATES PATENT AND TRADEMARK OFFICE
CERTIFICATE OF CORRECTION

PATENT NO. : 6,805,177 B2
DATED : October 19, 2004
INVENTOR(S) : Marco Nahmias Nanni et al.

It is certified that error appears in the above-identified patent and that said Letters Patent is hereby corrected as shown below:

<u>Column 10,</u>
Line 3, "claim 9," should read -- claim 19, --.

Signed and Sealed this

Tenth Day of May, 2005

JON W. DUDAS
*Director of the United States Patent and Trademark Office*